July 29, 1947.  J. A. REITAN  2,424,848
SOLDERING IRON
Filed Dec. 13, 1944
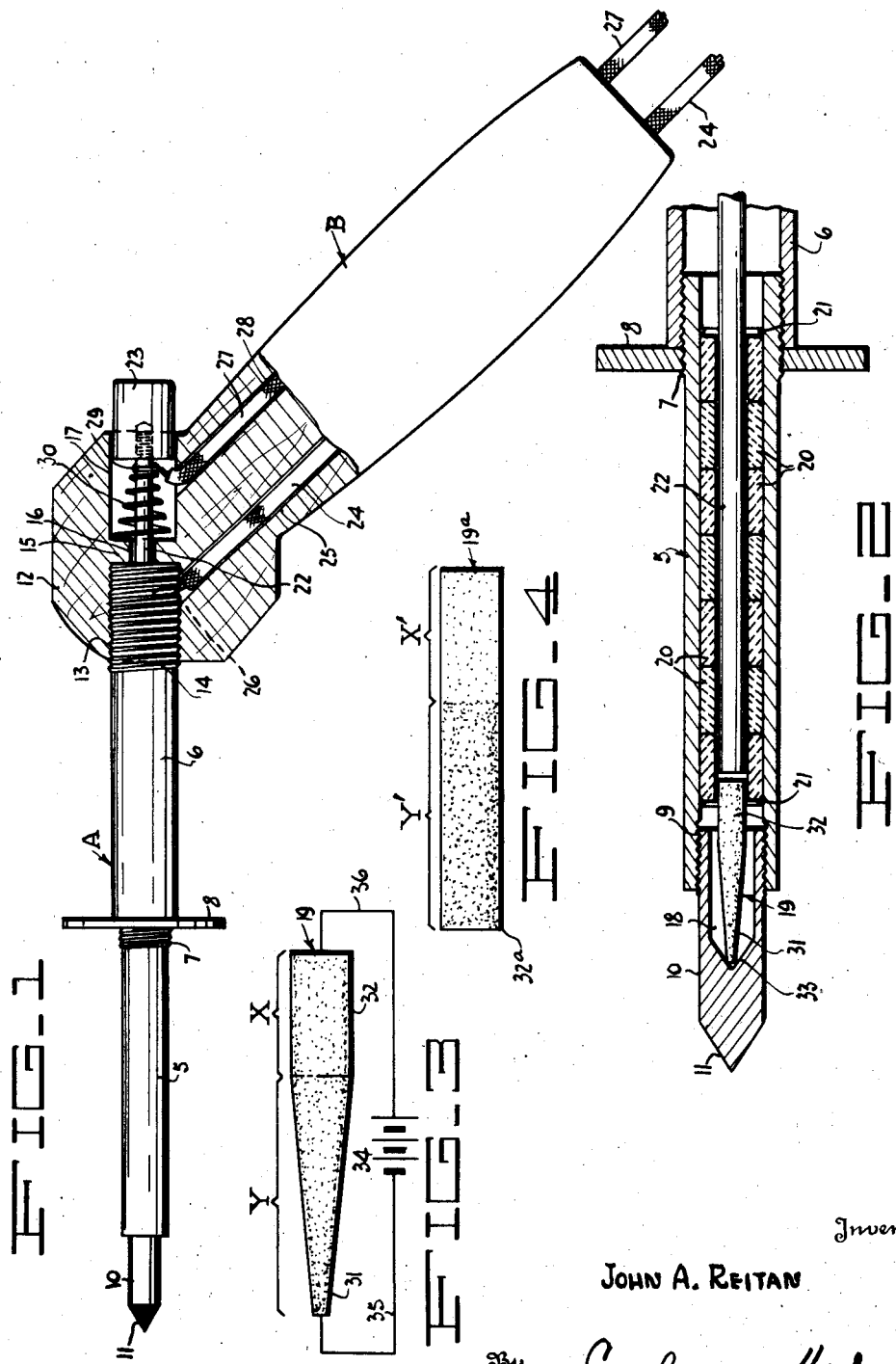
Inventor
JOHN A. REITAN
By Carlsen + Hayle
Attorneys Patented July 29, 1947

2,424,848

UNITED STATES PATENT OFFICE 2,424,848

SOLDERING IRON

John A. Reitan, Minneapolis, Minn., assignor to Met-Elec Corporation, Minneapolis, Minn., a corporation of Minnesota Application December 13, 1944, Serial No. 567,921

2 Claims. (Cl. 219—26)

This invention relates to improvements in electric soldering irons.

The primary object of the invention is to improve that type of soldering iron wherein the heating element takes the form of a small carbon or similar resistance element which heats almost instantly when the electric circuit across it is closed and which is disposed directly within the soldering tip to bring the same up to soldering temperature with utmost rapidity. Contact is made to close the circuit across the heating element by a reciprocating rod which, when actuated by a button in the handle, is moved endwise into contact with the heating element. Heretofore much difficulty has been experienced in such irons due to the fact that the heating element lasted only a short time, but even worse so heated the end of the reciprocating rod as to burn the same off and reduce its length shortly to a point at which contact could not be made with the element. In accordance with my object I provide an iron of this character in which the heating element has a long useful life and which will have little or no tendency to burn the end of the contact rod, so that it will last indefinitely. Another object is to provide a novel heating element which concentrates the maximum heat within the soldering tip and remains comparatively cool at the end engaged by the contact rod to prevent burning thereof. Still another object is to provide structural improvements throughout an iron of this type to reduce the cost thereof, while increasing its usefulness and life.

These and other more detailed and specific objects will be disclosed in the course of the following specification, reference being had to the accompanying drawings, in which—

Fig. 1 is a side elevation of my improved iron but with a part of the handle in section.

Fig. 2 is an enlarged longitudinal section along the line 2—2 in Fig. 1.

Fig. 3 is a detail side elevation of the heating element or unit alone but illustrating diagrammatically the connection thereacross of the operating potential from the iron.

Fig. 4 is a view similar to Fig. 3 but showing a slightly modified heating element.

Referring now more particularly and by reference characters to the drawing, A designates generally the body or barrel of my improved soldering iron, and B the handle to which it is affixed for convenience in manipulating it about the work.

The barrel A comprises two tubular sections 5 and 6 of graduated diameter so that the smaller section 5 may be screwed into larger section 6, as indicated at 7. To lock the parts against accidental disassembly I provide a circular lock nut 8 of large diameter which when screwed against the end of the barrel section 6 will lock the two sections together. The opposite or free end of the smaller barrel section 5 is tapped at 9 to receive the small copper soldering tip 10, the end of which is tapered off and squared in conventional fashion as shown at 11.

The handle B has an enlarged end 12 which has a tapped socket 13 in one side into which the threaded end 14 of the larger barrel section 6 is screwed as shown. The socket 13 extends at an angle to the axis of the handle as a whole, so that the handle extends angularly with respect to the barrel A with an included angle therebetween much greater than a right angle. This so positions the handle as to greatly facilitate the manipulation of the iron with a secure and comfortable grip upon the handle. The handle may be made of wood or similar insulating material. The lock nut 8 serves to hold the soldering tip 10 clear of the work bench when the iron is laid thereon.

At its inner end the socket 13 meets an annular shoulder 15 against which the barrel section 6 may be firmly screwed, and this shoulder forms a smaller opening 16 coaxial with socket 13, which communicates with a recess 17 opening through the side of the handle opposite to that through which said socket opens.

The soldering tip 10, which is of generally cylindrical form, is bored out from its threaded end, forming a recess or chamber 18 opening into the interior of the barrel section 5, and in this chamber there is positioned a heating element 19 which is formed of an elongated, rod-like section of carbon or similar graphitic or carbonaceous material, having the properties of being readily molded and mechanically strong, and electrically being a resistance. The length of this heating element 19 is such that, when in contact at one end with the closed end of the chamber 18, the opposite end will project into the barrel section 5 coaxially therewith, where this end of the element is received and supported in the end one of a series of tubular beads 20. These beads 20 are assembled one against the other endwise in the barrel section 5, and retained against endwise displacement therealong, as by conventional split ring retainers 21 of spring wire. The beads 20 are formed of an electrically insulating and heat resistant material, such as that known commercially as Steatite, and are of an outer diameter such as to nicely fit the barrel section and an inner diameter adapted to loosely fit the heating element 19. Also these beads fit and slidably support a metal contact rod 22 which extends from a point adjacent the heating element 19 entirely through the barrel A, the opening 16 and recess 17, being provided at its extremity with an operating button 23 which is positioned partially in said recess.

Electrical connection is made from the soldering tip 10 through the barrel A, which is, of course, of metal, to a flexible conductor 24 which is led into the handle B through a bore 25 formed therein, and which conductor has a bared tip 26 laid in the socket 13 and engaged by the threaded barrel end 14. Connection is made from the contact rod 22 to another conductor 27 which is led into a bore 28 in the handle and has a bared end soldered to the rod inwardly of the button 23 as indicated at 29.

An expansion coil spring 30 is placed around the contact rod 22 and against the shoulder 15 in such manner as to yieldably resist movement of the rod, by pressing the button 23 inward, or to the left as viewed in the drawing, and the arrangement is such that the contact rod normally clears the end of the heating element 19 a short distance as seen in Fig. 2.

In operation, the conductors 24 and 27, which of course are long enough for the purpose, are connected across a battery, transformer, or other source of electrical energy (not shown) and when it is desired to use the iron the button 23 is pressed by the thumb, moving the contact rod 22 into engagement with the heating element 19. Connection is thus made from opposite terminals of said electrical source to opposite ends of the heating element, through which, it being electrically a resistance, current is caused to flow. The effect is to cause this element almost instantly to be heated to a very high temperature and since it is located within the soldering tip 10, the tip very rapidly absorbs heat and reaches a temperature sufficient for soldering. When the button 23 is released the circuit is immediately broken by the action of the spring 30 as will be clearly apparent.

Thus far the operation of the iron is substantially conventional but it will be evident that trouble may well be experienced due to the high temperature of the heating element causing overheating, and actual melting of the end of the contact rod 22 which engages the end of the element. This difficulty is well known in the art, and it is found that the end of this rod may burn off so rapidly that in a short time the iron becomes inoperative. Furthermore, it is found that with the usual iron a large part of the available heat from the heating element is dissipated in and through the barrel A where it does no good.

Attention is now directed to the shape of the heating element as best shown in Figs. 2 and 3. As seen therein the element has a butt end portion of cylindrical shape or straight-sided formation occupying that part of its length indicated at X in Fig. 3 and from which the element tapers off evenly for the balance of its length as indicated at Y. Actually the greater part of the element is tapered and the smaller end, indicated at 31 is positioned within the soldering tip 10 while the larger end 32 is disposed within the end bead 20 where it acts to support the element at this end coaxially in the barrel and top. Cooperating for this purpose is the closed end of the chamber 18 in the tip, which end is tapered as indicated at 33 so as to center the smaller end 31 of the element, as clearly shown in Fig. 2. It will be evident from the foregoing that connection may be made between the electrical source operating the iron and the opposite ends of the heating element 19 only, and for convenience in the following discussion a battery 34 is indicated diagrammatically as connected through conductors 35 and 36 to the ends of the element, connecting the latter across, or in parallel with, the battery.

Assuming the carbonaceous material of which the heating element 19 is made to be of the same density or compactness throughout the length thereof, then the tapering end portion Y will have the effect of gradually reducing the cross sectional area of the element toward the end 31, increasing the resistance progressively so that at the end 31 the effective resistance is very much greater than that appearing at the larger end 32. As a result a greater voltage drop will occur across the tapering section Y of the element than across the larger end X and the smaller end 31 will thus operate at a much higher temperature than will the larger end 32. Thus, in the iron, the smaller end 31 of the element being positioned in the soldering tip 10 will provide the maximum heating effect thereon, as is desirable, while the larger, and comparatively low temperature, butt end 32 being positioned in the barrel A will heat it but little, wasting only a small part of the total available heat. More important this end 32 of the element will now have little or no burning effect on the end of the contact rod 22, completely eliminating the difficulty previously referred to as melting off the rod end. In practice it is found that the smaller tip end 31 of the heating element may assume a white heat while the larger butt end 32 will only run a dull red, thus indicating the distribution of the voltage drop along the element.

The same effect may be secured by the use of a heating element of the same diameter from end to end, as indicated at 19$^a$ in Fig. 4, if that portion thereof indicated at Y$^1$ is made of a material having a higher resistance than the portion X$^1$. I have attempted to indicate this by distinguishing the density of the carbonaceous material making up the element but the same effect may be secured by the admixture of other materials in the carbon during the molding process so that the resistance will increase toward the end 31$^a$, as will be apparent to those skilled in the art.

The centering effect of the tapered end 33 of the chamber 18 is important as it prevents the element 19 from contacting the sides of the chamber. It will be noted that the centering effect both by the tapered chamber end 33 and by the bead 20 engaging the larger end of the element insures that the circuit can only be closed across or along the full length of the element, so that the full benefit of the varying effective resistance thereof may be obtained.

It will be noted that the heating element 19 is not continuously pressed in place but is free to move somewhat and further that the contact rod 22 is reciprocated in closing the circuit to the element. This play, and the sliding action of the contact rod, serves to clear away the burned residue which is found to accumulate at and about the ends of the heating element and which residue material, if not cleared away, is found to interfere with proper electrical contact to the element.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. In a soldering iron of the character described, a barrel member, a soldering tip on one end of the barrel member, the said tip having a chamber opening at one end into the barrel member, a tubular insulating member in the barrel member, a contact rod movable endwise through said insulating member and axially of the barrel, a heating element slidably mounted at one end in the insulating member and extending axially into the chamber in the tip, and the arrangement being such that said heating element is normally free for axial movement with respect to the tip and contact rod.

2. In a soldering iron of the character described, a barrel member, a soldering tip on one end of the barrel member, the said tip having a chamber opening at one end into the barrel member, a tubular insulating member in the barrel member, a heating element having one end slidably supported axially in the end of said insulating member and projecting therefrom into the tip, and a contact rod slidably mounted in said insulating member for axial movement toward said heating element and normally spaced from the supported end thereof whereby the heating element may move about axially to clear burned material from its ends.

JOHN A. REITAN.

REFERENCES CITED

The following references are of record in the file of this patent:

UNITED STATES PATENTS

| Number | Name | Date |
|---|---|---|
| 1,463,951 | Groven | Aug. 7, 1923 |
| 2,386,332 | Miller | Oct. 9, 1945 |
| 1,878,014 | Steenweg | Sept. 20, 1932 |
| 620,306 | Hadaway, Jr. | Feb. 29, 1899 |
| 2,106,439 | Schubert | Jan. 25, 1938 |
| 2,297,303 | Humfeld | Sept. 29, 1942 |
| 2,244,576 | Schnebelen | June 3, 1941 |
| 1,491,389 | Frykman | Apr. 22, 1924 |
| 1,978,323 | Power | Oct. 23, 1934 |

FOREIGN PATENTS

| Number | Country | Date |
|---|---|---|
| 550,333 | Great Britain | Jan. 4, 1943 |